(12) United States Patent
Chen et al.

(10) Patent No.: US 12,452,430 B2
(45) Date of Patent: Oct. 21, 2025

(54) MOTION VECTOR DERIVATION OF SUBBLOCK-BASED TEMPLATE-MATCHING FOR SUBBLOCK BASED MOTION VECTOR PREDICTOR

(71) Applicant: Tencent America LLC, Palo Alto, CA (US)

(72) Inventors: Lien-Fei Chen, Hsinchu (TW); Guichun Li, San Jose, CA (US); Xin Zhao, Santa Clara, CA (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 106 days.

(21) Appl. No.: 18/241,084

(22) Filed: Aug. 31, 2023

(65) Prior Publication Data
US 2024/0129479 A1 Apr. 18, 2024

Related U.S. Application Data

(60) Provisional application No. 63/416,461, filed on Oct. 14, 2022.

(51) Int. Cl.
| | |
|---|---|
| *H04N 19/105* | (2014.01) |
| *H04N 19/137* | (2014.01) |
| *H04N 19/176* | (2014.01) |

(52) U.S. Cl.
CPC ........ *H04N 19/137* (2014.11); *H04N 19/105* (2014.11); *H04N 19/176* (2014.11)

(58) Field of Classification Search
None
See application file for complete search history.

(56) References Cited

U.S. PATENT DOCUMENTS

2024/0275943 A1* 8/2024 Zhang .................. H04N 19/583

* cited by examiner

*Primary Examiner* — Christopher G Findley
(74) *Attorney, Agent, or Firm* — ArentFox Schiff LLP

(57) ABSTRACT

A video bitstream is received. The video bitstream includes a current block comprising a plurality of subblocks and a template region of the current block comprising a plurality of template subblocks adjacent to at least one of a top side and a left side of the current block. A motion vector (MV) located in a center position of the current block is determined. The MV is determined based on at least one MV of the plurality of subblocks of the current block. A MV for each of the plurality of template subblocks is determined based on the MV located in the center position of the current block and a respective MV of a corresponding subblock of the plurality of subblocks that is adjacent to the respective template subblock. The current block is reconstructed based on the determined MVs for the plurality of template subblocks.

20 Claims, 14 Drawing Sheets

MOTION VECTOR DERIVATION OF SUBBLOCK-BASED TEMPLATE-MATCHING FOR SUBBLOCK BASED MOTION VECTOR PREDICTOR

INCORPORATION BY REFERENCE

The present application claims the benefit of priority to U.S. Provisional Application No. 63/416,461, "Motion Vector Derivation of Subblock-Based Template-Matching for Subblock Based Motion Vector Predictor" filed on Oct. 14, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry.

According to an aspect of the disclosure, a method of video decoding performed in a video decoder is provided. In the method, a video bitstream is received. The video bitstream includes a current block comprising a plurality of subblocks and a template region of the current block comprising a plurality of template subblocks adjacent to at least one of a top side and a left side of the current block. A motion vector (MV) located in a center position of the current block is determined. The MV is determined based on at least one MV of the plurality of subblocks of the current block. A MV for each of the plurality of template subblocks is determined based on the MV located in the center position of the current block and a respective MV of a corresponding subblock of the plurality of subblocks that is adjacent to the respective template subblock. The current block is reconstructed based on the determined MVs for the plurality of template subblocks.

In an example, the MV located in the center position of the current block is determined as a MV from one of a top-left subblock, a bottom-left subblock, a top-right subblock, and a bottom-right subblock of the current block.

In an example, the MV located in the center position of the current block is determined as a MV from one of the plurality of subblocks, where the one of the plurality of subblocks is selected based on one of a median sample value and a prediction mode of the one of the plurality of subblocks.

In an example, the MV located in the center position of the current block is determined as an average of a subset of the MVs of the plurality of subblocks.

In an aspect, the MV for each of the plurality of template subblocks is determined as a uni-prediction MV based on the MV located in the center position of the current block being a uni-prediction MV. In an aspect, the MV for each of the plurality of template subblocks is determined as a bi-prediction MV based on the MV located in the center position of the current block being a bi-prediction MV.

In an example, based on (i) a MV of a first subblock of the plurality of subblocks being a uni-prediction MV in a first reference list, (ii) a MV for a first template subblock of the plurality of template subblocks adjacent to the first subblock being a uni-prediction MV in a second reference list, and (iii) the MV located in the center position of the current block being a uni-prediction MV in the second reference list, the MV for the first template subblock is determined as the MV located in the center position of the current block.

In an example, based on (i) a MV of a first subblock of the plurality of subblocks being a uni-prediction MV in a first reference list, (ii) a MV for a first template subblock of the plurality of template subblocks adjacent to the first subblock being a bi-prediction MV, and (iii) the MV located in the center position of the current block being a bi-prediction MV that include a first component in the first reference list and a second component in a second reference list, the MV for the first template subblock is determined to include the MV of the first subblock in the first reference list and the second component of the MV located in the center position of the current block in the second reference list.

In an example, based on the MV located in the center position of the current block being a uni-prediction MV, the MV for each of the plurality of template subblocks is determined as the MV of the subblock of the plurality of subblocks adjacent to the respective template subblock.

In an example, based on the MV located in the center position of the current block being a bi-prediction MV, the MV for each of the plurality of template subblocks is determined as the MV of the subblock of the plurality of subblocks adjacent to the respective template subblock.

In an example, based on (i) the MV located in the center position of the current block being a uni-prediction MV in a first reference list (ii) a MV for a first subblock of the plurality of subblocks adjacent to a first template subblock of the plurality of template subblocks being a uni-prediction in a second reference list, the MV for the first template subblock is determine as a bi-prediction MV that includes the MV located in the center position of the current block in the first reference list and the MV for the first subblock in the second reference list.

In an example, to reconstruct the current block, a reference block of the current block is determined based on a difference value between a template region of the reference block and the template region of the current block, where the template region of the reference block is indicated by the MVs of the plurality of template subblocks. Each of the plurality of subblocks is further reconstructed based on a respective subblock of the reference block.

According to another aspect of the disclosure, an apparatus is provided. The apparatus includes processing circuitry. The processing circuitry can be configured to perform any of the described methods for video decoding/encoding.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 7 shows a first example of subblock-based template matching process for SbTMPV according to some embodiments of the disclosure.

FIG. 8 shows a second example of subblock-based template matching process for SbTMPV according to some embodiments of the disclosure.

FIG. 10 shows a fourth example of subblock-based template matching process for SbTMPV according to some embodiments of the disclosure.

DETAILED DESCRIPTION OF EMBODIMENTS

Figure 1:
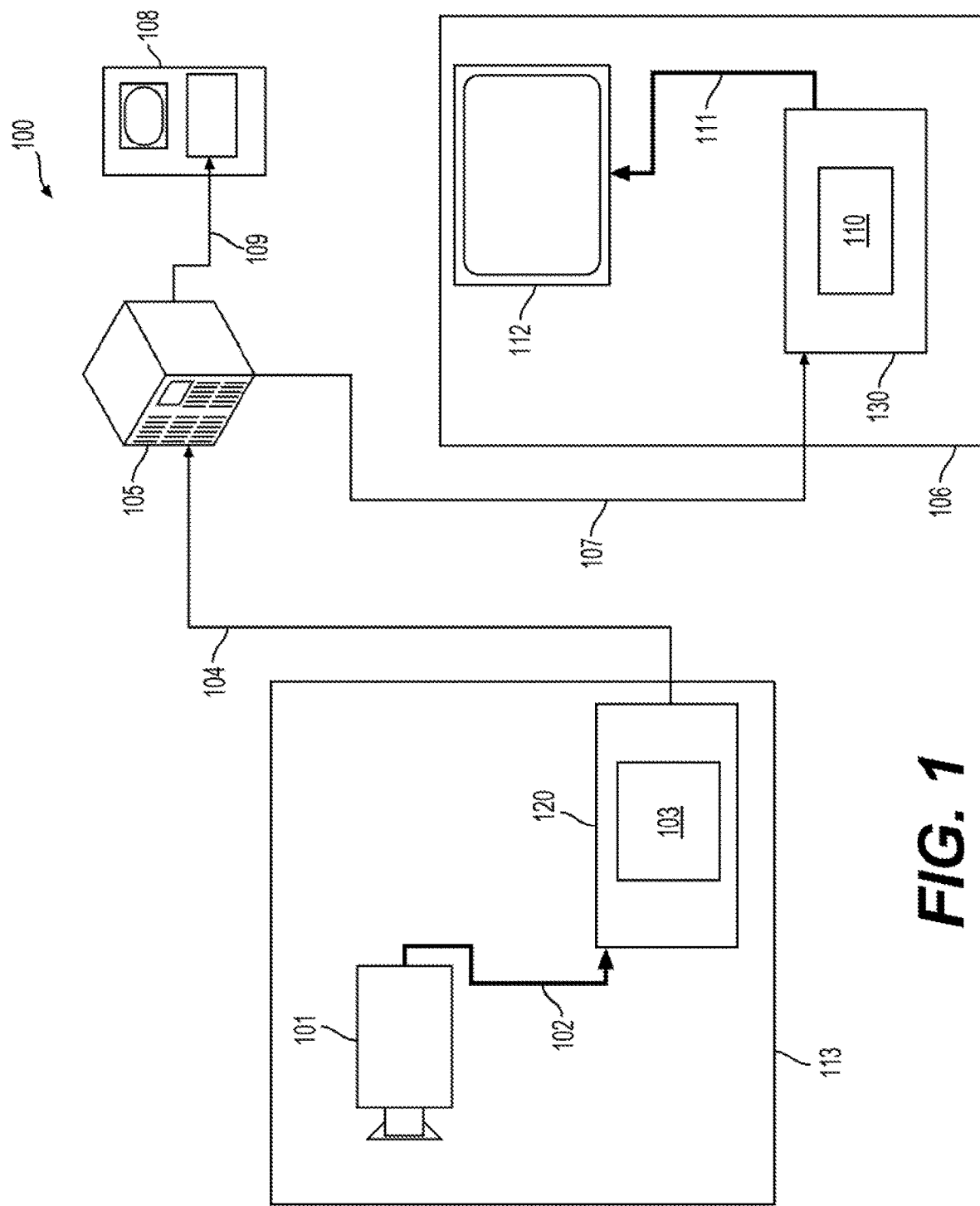
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
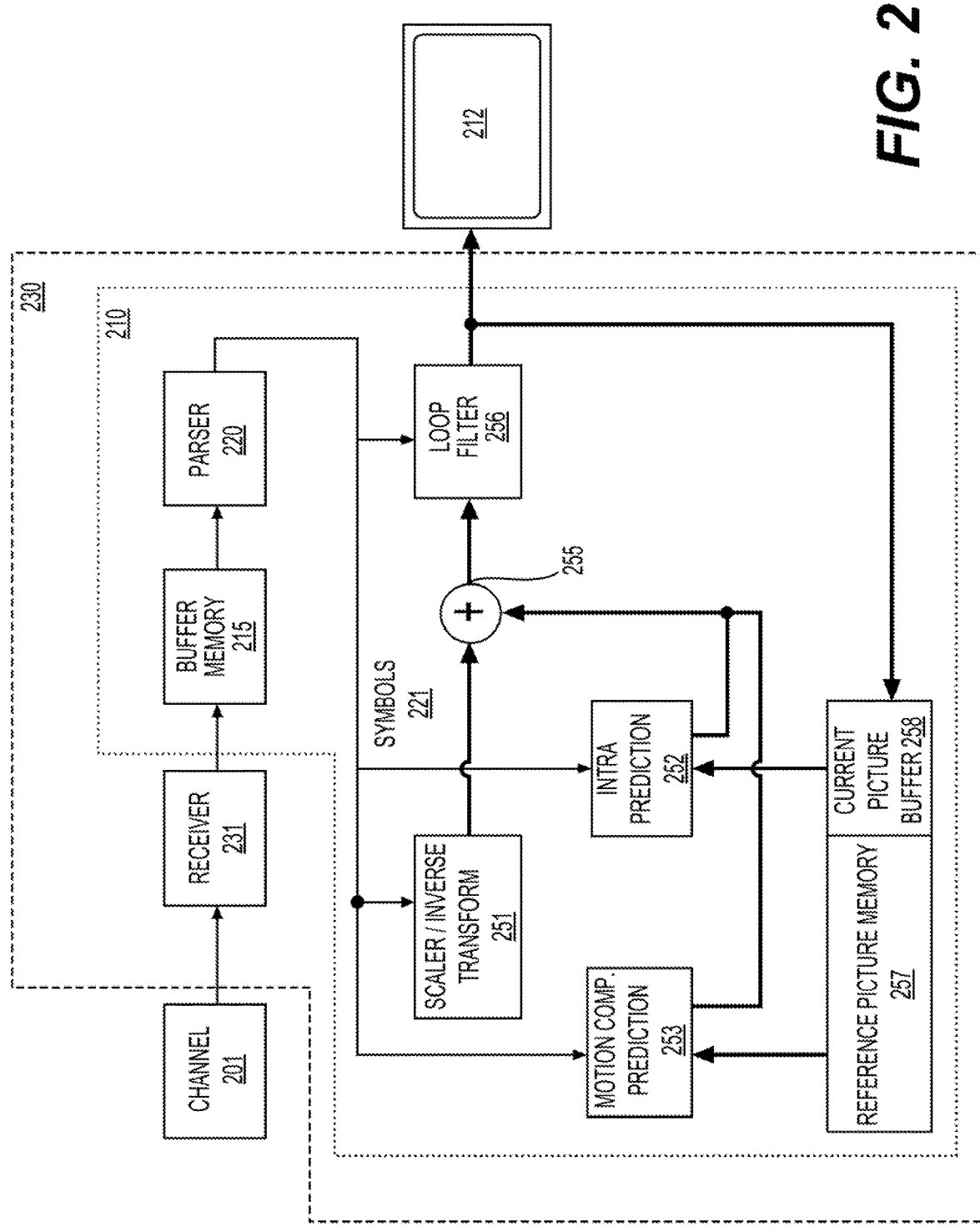
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
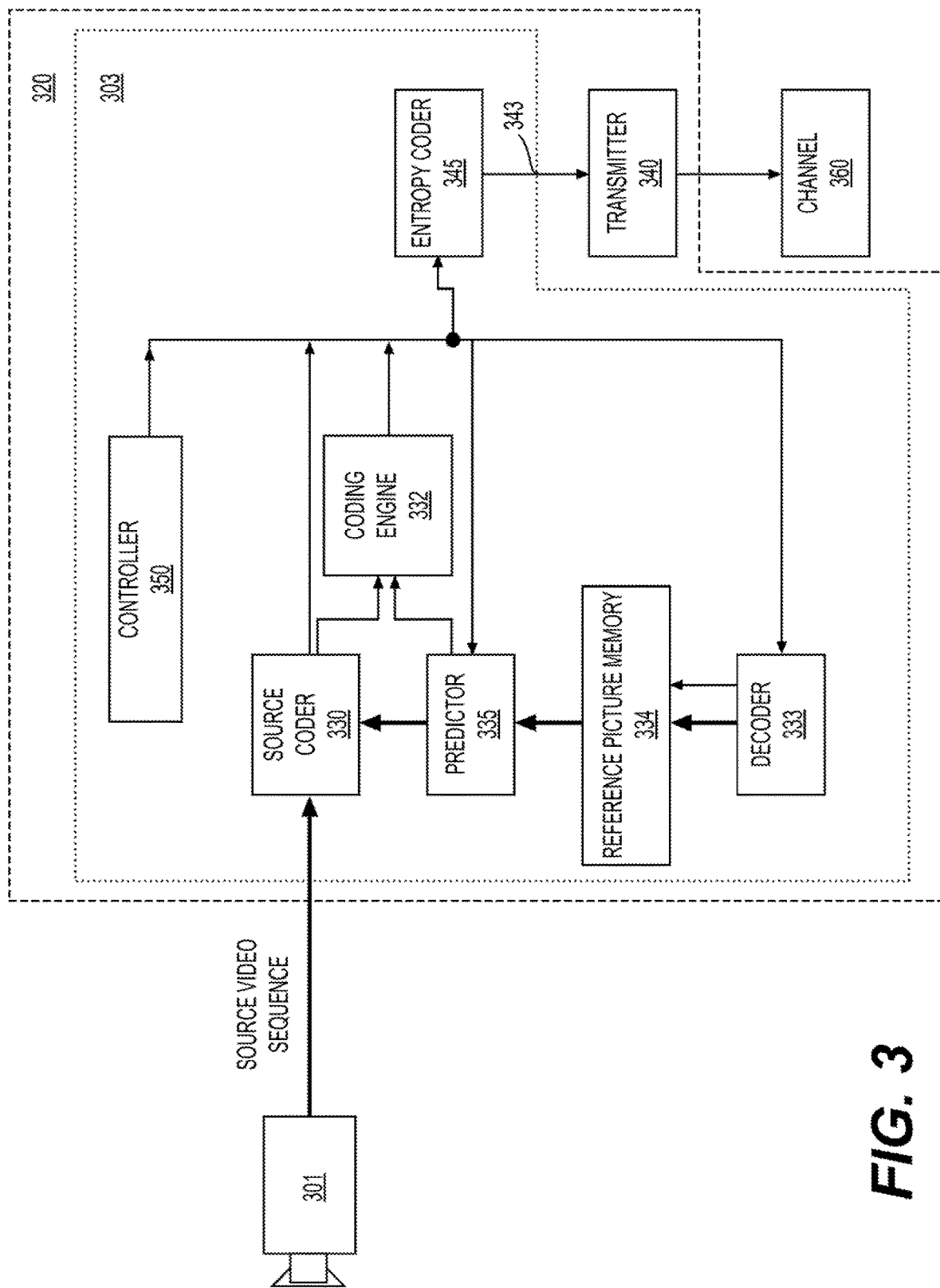
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

This disclosure includes aspects related to motion vector (MV) derivation, such as MV derivation of a subblock template within a current template based on a subblock-based template-matching in subblock-based temporal motion vector prediction (SbTMVP) mode.

To improve coding efficiency and reduce a transmission overhead of a motion vector, a subblock level motion vector refinement can be applied to extend a CU level temporal motion vector prediction (TMVP). A subblock-based TMVP (SbTMVP) can allow inheritance of motion information at a subblock-level from a collocated reference picture. Each subblock of a large size CU can have respective motion information without explicitly transmitting the block partition structure or motion information. In an example, SbTMVP can obtain motion information for each subblock in three steps. In a first step, a displacement vector (DV) of the current CU can be derived. In a second step, an availability of the SbTMVP candidate can be checked and a central motion can be derived. In a third step, the subblock motion information can be derived from a corresponding subblock by the DV. Unlike TMVP candidate derivation which may derive the temporal motion vectors from the collocated block in the reference frame, SbTMVP can apply a DV which may be derived from the MV of the left neighboring CU of the current CU to find a corresponding subblock in the collocated picture for each subblock of the current CU. When the corresponding subblock is not inter-coded, the motion information of the current subblock can be set as the central motion.

The SbTMVP can be supported by a codec, such as VVC. Similar to the TMVP that is provided in HEVC, SbTMVP can apply a motion field in a collocated picture to improve motion vector prediction and a merge mode for CUs in a current picture. The collocated picture used by TMVP can also be used for SbTVMP. SbTMVP can differ from TMVP in two main aspects as follows:

(1) TMVP predicts motion at a CU level but SbTMVP predicts motion at a sub-CU level;
(2) TMVP can fetch the temporal motion vectors from the collocated block in the collocated picture (e.g., the collocated block can be a bottom-right block or a center block relative to the current CU). SbTMVP can apply a motion shift before the temporal motion information is fetched from the collocated picture, where the motion shift can be obtained from the motion vector from one of the spatial neighboring blocks of the current CU.

Figure 4:
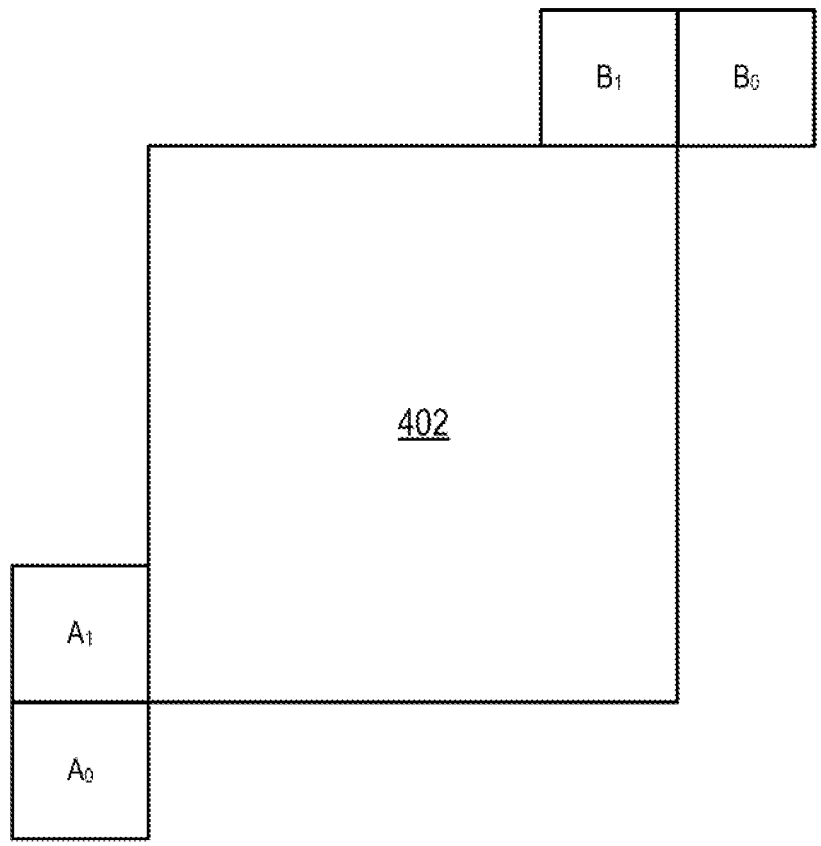
FIG. 4 shows exemplary spatial neighboring blocks used for temporal motion vector prediction (TMVP).
Figure 5:
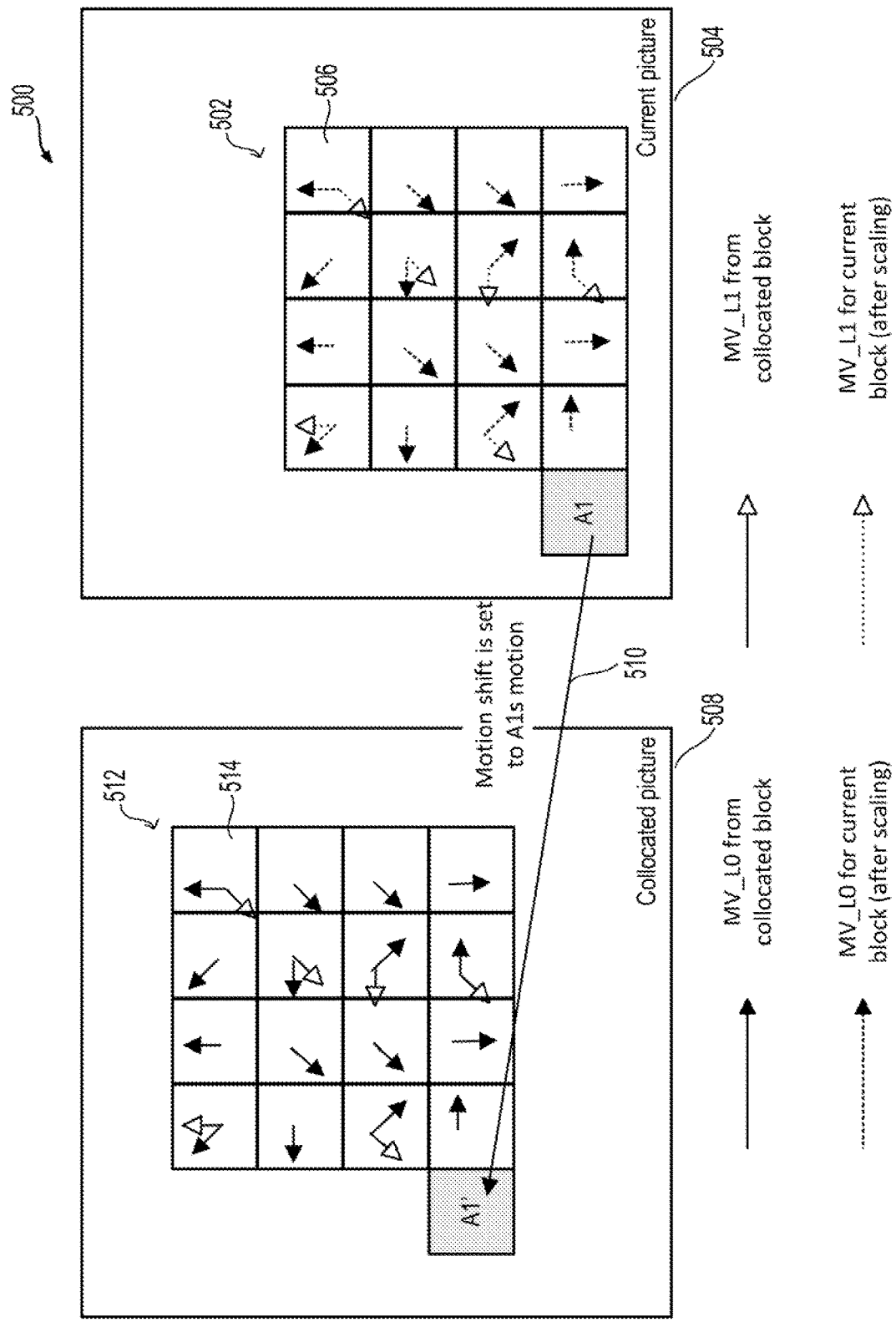
FIG. 5 is a schematic illustration of a subblock-based TMPV (SbTMVP) process.

An exemplary SbTVMP process can be illustrated in FIGS. 4-5. FIG. 4 shows exemplary spatial neighboring blocks (e.g., A0, A1, B0 and B1) of a current block (402) used in TMVP. FIG. 5 shows an exemplary SbTMVP process (500). As shown in FIG. 5, a current CU (502) can be included in a current picture (504). The current CU (502) includes a plurality of sub-CUs (e.g., (506)). The current picture (504) can correspond to a collocated picture (508). In an example, SbTMVP can predict motion vectors of sub-CUs (e.g., (506)) within the current CU (502) in two steps. In a first step, a spatial neighbor, such as A1, of the current CU (502) can be examined. The exemplary candidate spatial neighbors applied for the SbTMVP process (500) can be shown in FIG. 4. If the spatial neighbor, such as A1, has a motion vector (510) that uses the collocated picture (508) as a reference picture, the motion vector (510) can be selected as a motion shift (or displacement vector) for the SbTMVP process (500). If such a motion vector is not identified, the motion shift can be set as (0, 0).

In a second step, the motion shift (e.g., (510)) identified in the first step can be applied, such as added to coordinates of the current CU (502), to obtain sub-CU-level motion information (e.g., motion vectors and reference indices) from the collocated picture (508). As shown in FIG. 5, according to the motion shift derived based on the motion vector (510) of the spatial neighbor A1, a reference block A1' in the collocated picture (508) can be identified. The reference block A1' can correspond to a reference CU (512) in the collocated picture (508). Thus, for each sub-CU (e.g., (506)) of the current CU (502), the motion information of a corresponding block (or corresponding sub-CU (e.g., (514)) in the reference CU (512) of the collocated picture (508) can be used to derive the motion information for the sub-CU (e.g., (506)). After the motion information of the collocated sub-CU (e.g., (514)) is identified, the motion information can be converted to the motion vectors and reference indices of the current sub-CU (e.g., (506)) in a similar way as the TMVP process of HEVC, where a temporal motion scaling can be applied to align the temporal motion vectors of the reference picture (508) to the temporal motion vectors of the current CU (502).

A combined subblock based merge list can contain both SbTVMP candidates and affine merge candidates and be used in a subblock based merge mode. The SbTVMP mode can be enabled/disabled by a sequence parameter set (SPS) flag. If the SbTMVP mode is enabled, the SbTMVP predictor can be added as a first entry of the list of subblock based merge candidates and followed by the affine merge candidates. A size of subblock based merge list can be signalled in SPS and a maximum allowed size of the subblock based merge list can be 5, for example in VVC.

The sub-CU size used in SbTMVP, such as in VVC, can be fixed as 8×8. Similar to an affine merge mode, SbTMVP mode can be applicable to a CU with both a width and a height larger than or equal to 8. The subblock (or sub-CU) size can be explored beyond VVC. For example, in ECM, the sub-CU size can be configurable to other sizes, such as 4×4. Two collocated pictures, or frames, can be utilized to provide the temporal motion information for SbTMVP and TMVP in AMVP mode.

To obtain better (or improved) matching, a signaled extra motion vector offset (MVO) can be added to a displacement motion vector (DV). By using the MVO($x_o$, $y_o$), a location of a MV field within a collocated CU can be adjusted. When the MVO($x_o$, $y_o$) is not a zero motion offset, a DV', which can be an sum of the DV and the MVO, can be used as the displacement vector to indicate the location of collocated CU to derive the SbTMVP.

In related examples, a DV can be used as a motion vector of template-matching for SbTMVP. However, a DV for SbTMVP is configured to point out a position of a motion field at a collocated reference picture. Thus, using a DV in template-matching may not be quite reliable, because the DV may not be used as a motion vector for a current CU in SbTMVP and SbTMVP with MMVD.

In related examples, multiple collocated pictures can be utilized for SbTMVP. However, different derivation methods from multiple collocated reference pictures may have different coding performances.

In related examples, either a center MV or an adjacent subblock MV from SbTMVP can be used to point to a reference template or a subblock reference template. However, none of the center MV and the adjacent subblock MV may be combined to derive a MV for each subblock template.

In the disclosure, MV derivation of a subblock template within a current template is provided. A MV of the subblock template can be derived based on a subblock-based template-matching in SbTMVP mode. In an example, a center MV (e.g., a MV located in a center position of a current block) instead of a MV at (0,0) is used to prevent a random initial value causing mismatch between an encoder and a decoder. The accuracy and prediction of the coding process can be improved.

In an aspect, when the current CU is coded in SbTMVP mode, the DV is used to point to the center position of the MV field for the current CU at the collocated reference picture. At that collocated reference picture, the MV data can be got from the center position of the corresponding MV field in the collocated reference picture, and it could be called a "center MV" in SbTMVP. For example, the MV data at the position (2, 2) within the MV field in FIG. 6 could be called "center MV" for SbTMVP mode. In an example, the template is split into subblock templates, and the motion vector of each subblock template is derived not only by using the MV from the adjacent subblock within the current coding block but also by using the center MV which is mentioned before.

Figure 6:
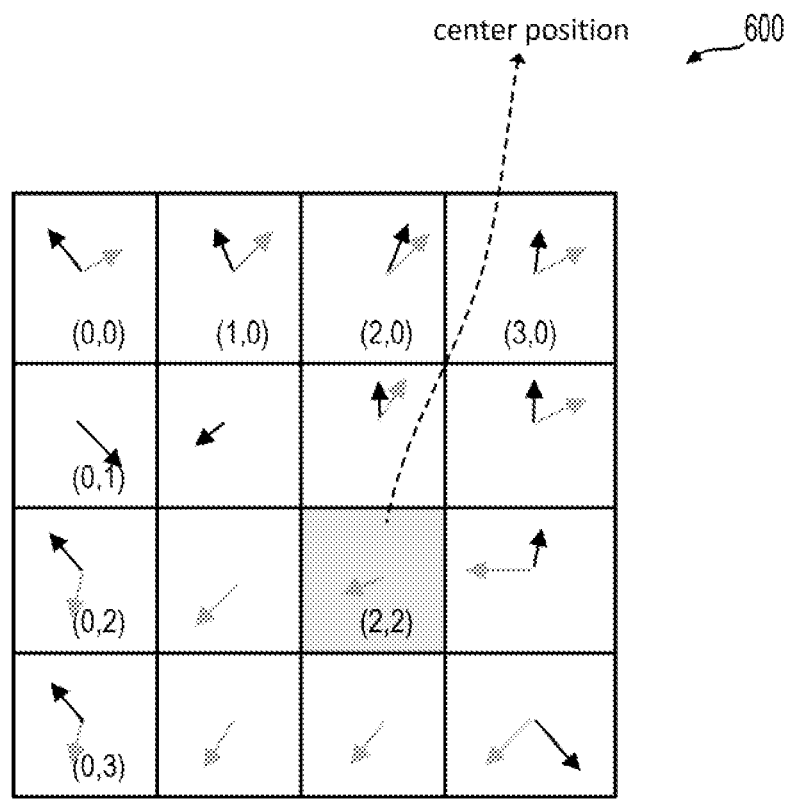
FIG. 6 shows an exemplary block coded with SbTMVP.

In an embodiment, when a current CU is coded in SbTMVP mode, a DV can be used to point from a reference position of the current CU to a reference position of a reference CU at a collocated reference picture. The reference position is a center position in an example. At the collocated reference picture, MV data can be obtained from a center position of a corresponding MV field in the collocated reference picture, and the MV data in the center position can be called as "center MV" in SbTMVP. For example, as shown in FIG. 6, MV data at position (2, 2) within a MV field (600) can be called a "center MV" for SbTMVP mode.

In the disclosure, a template (or template region) can be split into a plurality of subblock templates (or template subblocks). A motion vector of each subblock template can be derived not only by using a MV from an adjacent subblock of a current coding block but also by using a center MV associated with the current coding block.

In an aspect, the center MV could be derived from any subblock MV of SbTMVP, for example, center MV is the MV from top-left, bottom-left, top-right, or bottom-right subblock of SbTMVP.

In an embodiment, a center MV associated with a current block that is coded in SbTMVP mode can be derived from any suitable subblock MV of SbTMVP. For example, a center MV can be determined as a MV from one of a top-left subblock, a bottom-left subblock, a top-right subblock, and a bottom-right subblock of SbTMVP.

In an aspect, the center MV could be derived from the filtering of the subblock MVs of SbTMVP. The utilized filter could be but is not limited to the median filter, mode filter, weighting average filter . . . , etc.

In an embodiment, a center MV can be derived by filtering subblock MVs of SbTMVP. A utilized filter can be but is not limited to a median filter, a mode filter, a weighting average filter, or the like. In an example, based on the median filter, a center MV can be determined as a MV from a subblock of a current block that is selected based on a median sample value of the selected subblock. In an example, based on the mode filter, a center MV can be determined as a MV from a subblock of the current block that is selected based on a prediction mode of the selected subblock. In an example, based on the weighting average filter, a center MV can be determined as an average (or a weighted combination) of a subset of the MVs of the plurality of subblocks.

In an aspect, the inter prediction direction from L0, L1, or bi, for the subblock template is determined by the inter prediction direction of the center MV of SbTMVP.

In an embodiment, an inter prediction direction can be a first prediction associated with a first reference list (e.g., L0), a second prediction direction associated with a second reference list (e.g., L1), or a bi-prediction direction associated with both reference lists (e.g., L0 and L1). An inter prediction direction of a subblock template can be determined by an inter prediction direction of a center MV of SbTMVP. For example, if an inter prediction direction of the center MV is a bi-prediction direction, the intra prediction direction of the subblock template is also bi-prediction direction.

In an aspect, when the reference index at reference list x of adjacent subblock MV of SbTMVP is not valid and the reference index at reference list x of center MV of SbTMVP is valid, the center MV and reference index on reference list x could be used as the MV at reference list x for the subblock template at reference list x. An example can be shown in FIGS. 7 and 8.

In an embodiment, when a reference index of a reference list x of an adjacent subblock MV of SbTMVP is not valid and a reference index of the reference list x of a center MV of SbTMVP is valid, the center MV and the reference index of the reference list x for the center MV can be used as a MV of the reference list x for the subblock template of the reference list x.

Figure 7:
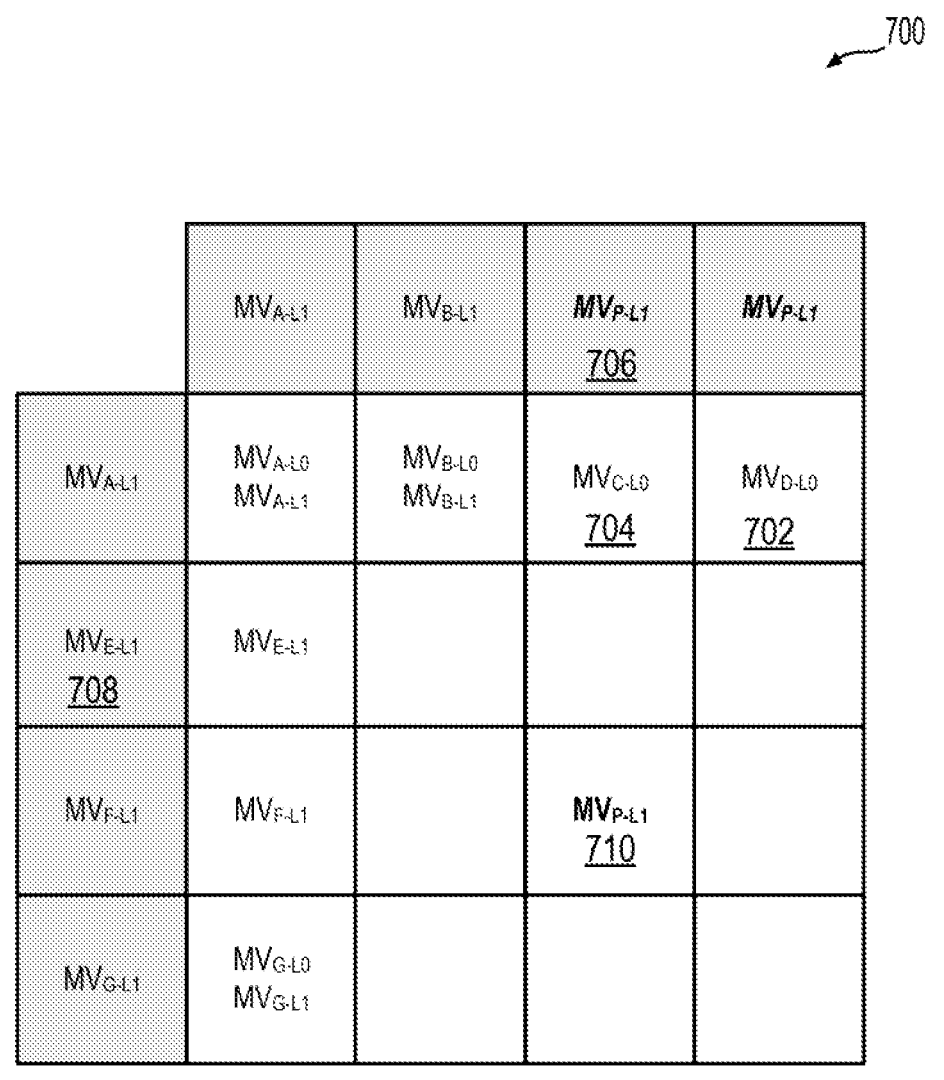

In an example, as shown in FIG. 7, a current block (700) can include a plurality of subblocks, such as a subblock (702) and a subblock (704). The current block (700) can also include a template region over a top side and at a left side of the current block (700). The template region can include a plurality of template subblocks (or subblock templates), such as template subblocks (706) and (708). Based on (i) a MV of a first subblock (e.g., (704)) of the plurality of subblocks of a current block (700) being a uni-prediction MV in a first reference list (e.g., L0), (ii) a MV for a first template subblock (706) of the plurality of template subblocks adjacent to the first subblock (e.g., (704)) being a uni-prediction MV in a second reference list (e.g., L1), and (iii) a center MV (710) being a uni-prediction MV in the second reference list, the MV for the first template subblock (706) can be determined as the center MV (710).

Figure 8:
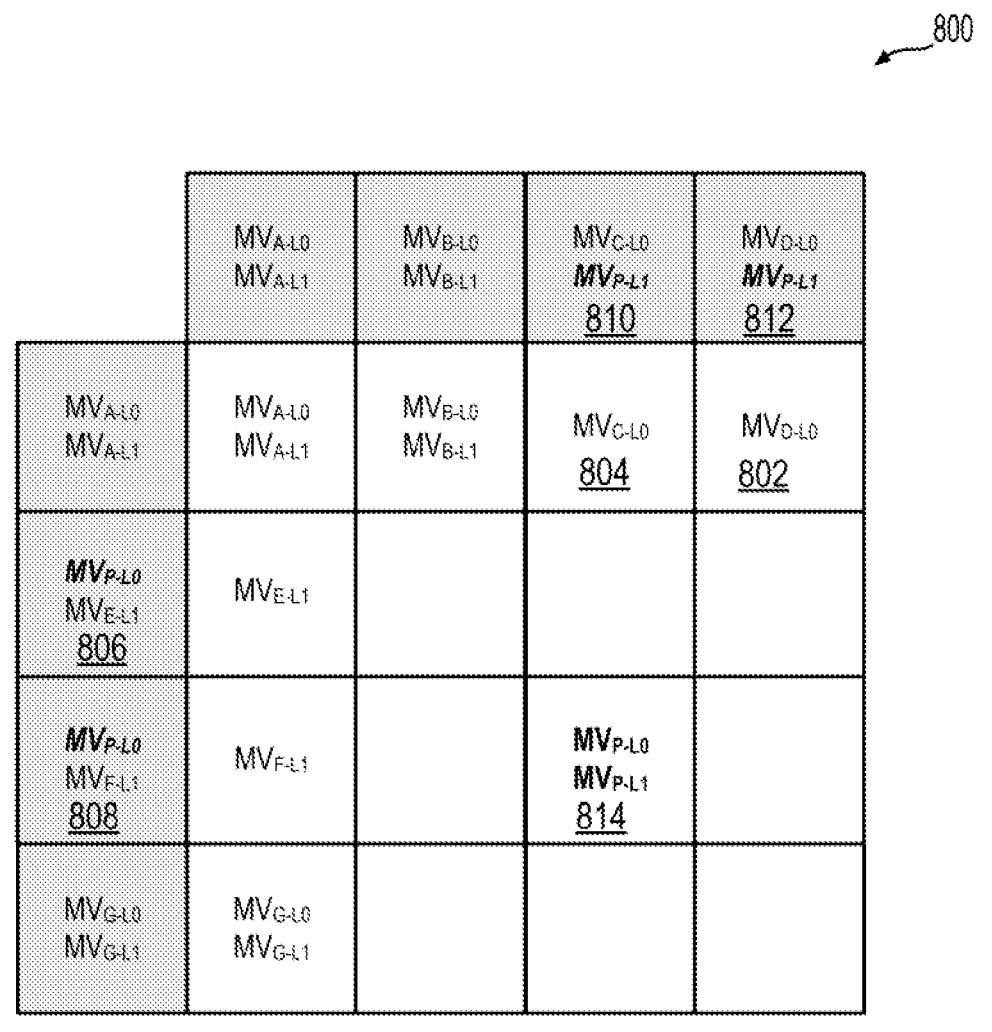

In another example, as shown in FIG. 8, a current block (800) can include a plurality of subblocks, such as subblocks (802) and (804). The current block (800) can include a template region that includes a plurality of template subblocks, such as template subblocks (806), (808), (810), and (812). Based on (i) a MV of a first subblock (e.g., (804)) of the plurality of subblocks being a uni-prediction MV in a first reference list (e.g., L0), (ii) a MV for a first template subblock (e.g., (810)) of the plurality of template subblocks adjacent to the first subblock (e.g., (804)) being a bi-prediction MV, and (iii) a center MV (814) being a bi-prediction MV that include a first component (e.g., $MV_{P-L0}$) in the first reference list (e.g., L0) and a second component (e.g., $MV_{P-L1}$) in a second reference list (e.g., L1), the MV for the first template subblock (e.g., (810)) can include the MV (e.g., $MV_{C-L0}$) of the first subblock (e.g., (804)) in the first reference list (e.g., L0) and the second component (e.g., $MV_{P-L1}$) of the center MV (814) in the second reference list (e.g., L1).

Figure 9:
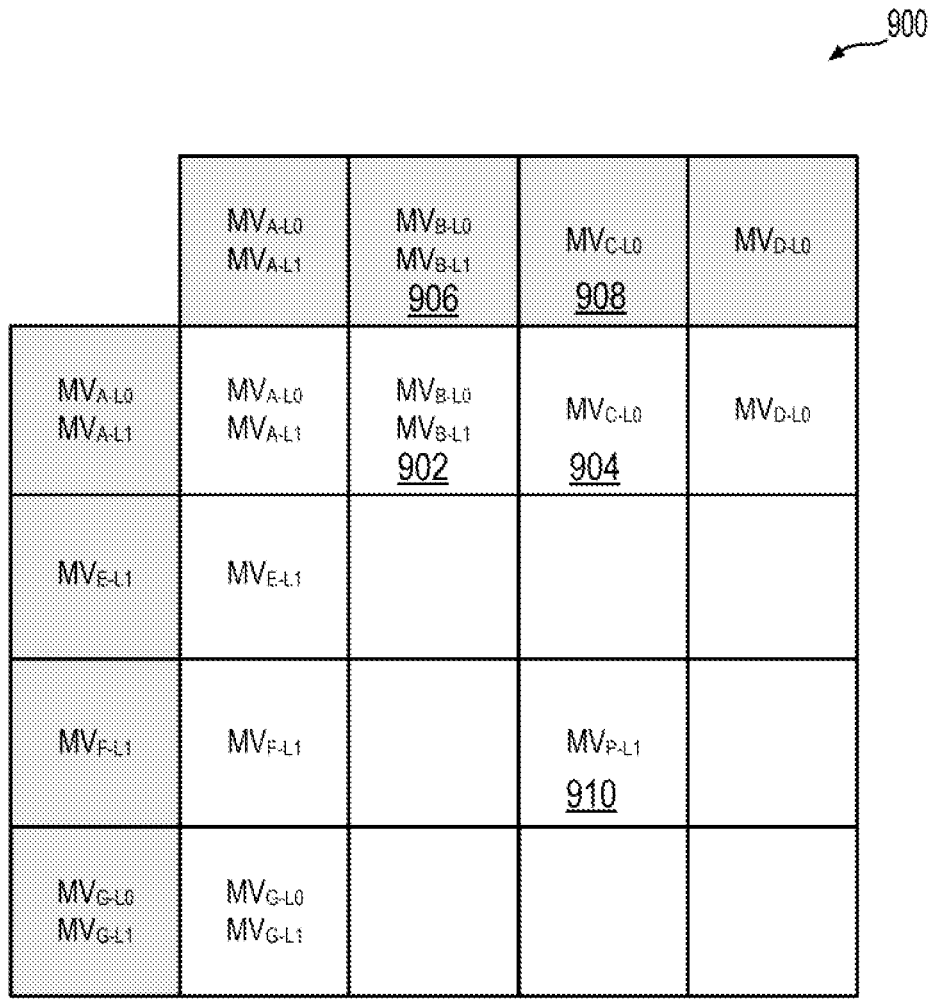
FIG. 9 shows a third example of subblock-based template matching process for SbTMPV according to some embodiments of the disclosure.

In an aspect, when the center MV is a bi-prediction, the process in FIG. 8 can be applied. Otherwise, when the center MV is a uni-prediction, the subblock template area only uses its neighboring subblock MV of the SbTMVP block, as shown in FIG. 9.

In an embodiment, when a center MV is a bi-prediction, a derivation of a MV for a template subblock shown in FIG. 8 can be applied. When the center MV is a uni-prediction, the derivation of the MV for the template subblock may use a MV from a neighboring subblock of the SbTMVP block. For example, as shown in FIG. 9, a current block (900) can include a plurality of subblocks, such as subblocks (902) and (904). The current block (900) can include a plurality of template subblocks, such as template subblocks (906) and (908). Based on a center MV (910) being a uni-prediction MV, the MV for each of the plurality of template subblocks can be determined as the MV of the subblock of the plurality of subblocks adjacent to the respective template subblock. For example, the MV of the template subblock (906) can be determined as the MV of the subblock (902), and the MV of the template subblock (908) can be determined as the MV of the subblock (904).

Figure 10:
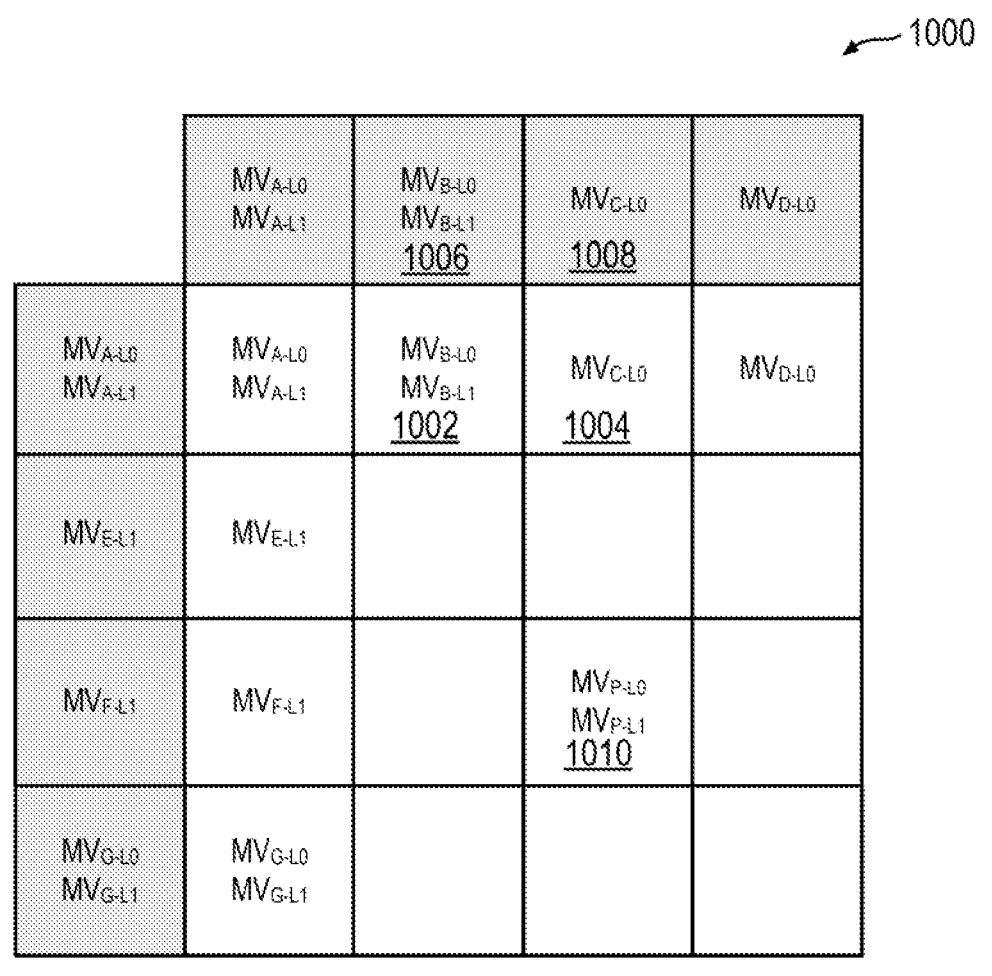

In an aspect, when the center MV is a uni-prediction, the process shown in FIG. 7 can be applied. Otherwise, when the center MV is a bi-prediction, the subblock template area only uses its neighboring subblock MV of the SbTMVP block, as shown in FIG. 10.

In an embodiment, when a center MV is a uni-prediction, a derivation of a MV for a template subblock shown in FIG. 7 can be applied. When the center MV is a bi-prediction, the derivation of the MV for the template subblock may uses a MV from a neighboring subblock MV of the SbTMVP block. For example, as shown in FIG. 10, a current block (1000) can include a plurality of subblocks, such as subblocks (1002) and (1004). The current block (1000) can include a plurality of template subblocks, such as template subblocks (1006) and (1008). Based on a center MV (1010) being a bi-prediction MV, the MV for each of the plurality of template subblocks can be determined as the MV of the subblock of the plurality of subblocks adjacent to the respective template subblock. For example, the MV of the template subblock (1006) can be determined as the MV of the subblock (1002), and the MV of the template subblock (1008) can be determined as the MV of the subblock (1004).

Figure 11:
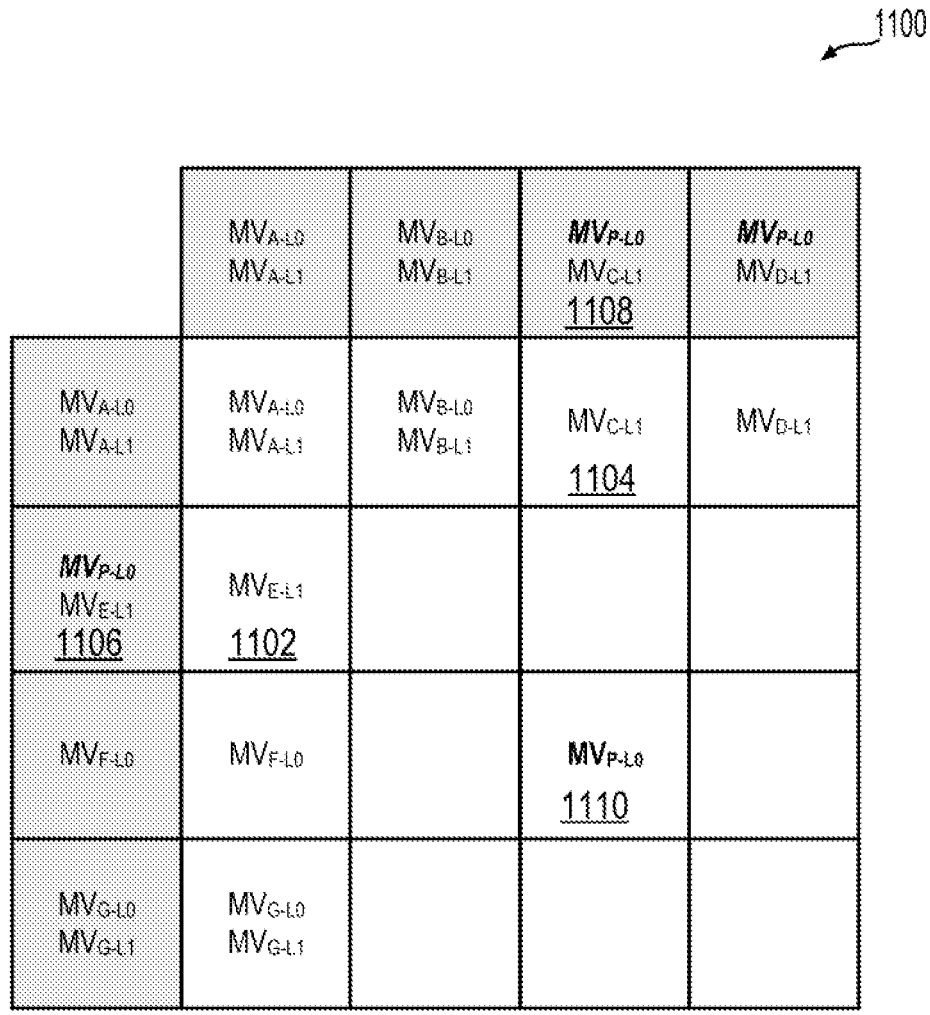
FIG. 11 show a fifth example of subblock-based template matching process for SbTMPV according to some embodiments of the disclosure.

In an aspect, when the center MV is a uni-prediction with MV on one reference list (e.g., L0), and an adjacent subblock in SbTMVP block is uni-prediction with MV on another reference list (e.g., L1) as shown in FIG. 11, the template subblock area uses a bi-prediction combined by the MVs from the center MV and the adjacent subblock MV.

In an embodiment, when a center MV is a uni-prediction with a MV on one reference list (e.g., L0), and an adjacent subblock in SbTMVP block is a uni-prediction with a MV on another reference list (e.g., L1), a template subblock area can use a bi-prediction combined by the MVs from the center MV and the adjacent subblock MV. For example, as shown in FIG. 11, a current block (or SbTMVP block) (1100) can include a plurality of subblocks, such as subblocks (1102) and (1104). The current block (1100) can include a plurality of template subblocks, such as template subblocks (1106) and (1108). Based on (i) a center MV (1110) being a uni-prediction MV in a first reference list (e.g., L0) and (ii) a MV (e.g., $MV_{C-L1}$) for a first subblock (e.g., (1104)) of the plurality of subblocks adjacent to a first template subblock (e.g., (1108)) of the plurality of template subblocks being a uni-prediction in a second reference list (e.g., L1), the MV for the first template subblock (e.g., (1108)) can be determined as a bi-prediction MV that includes the center MV (1110) in the first reference list (e.g., L0) and the MV (e.g., $MV_{C-L1}$) for the first subblock (e.g., (1104)) in the second reference list (e.g., L1). Similarly, the MV for the template subblock (1106) can include the MV (e.g., $MV_{E-L1}$) of the subblock (1102) and the center MV (e.g., $MV_{P-L0}$).

Figure 12:
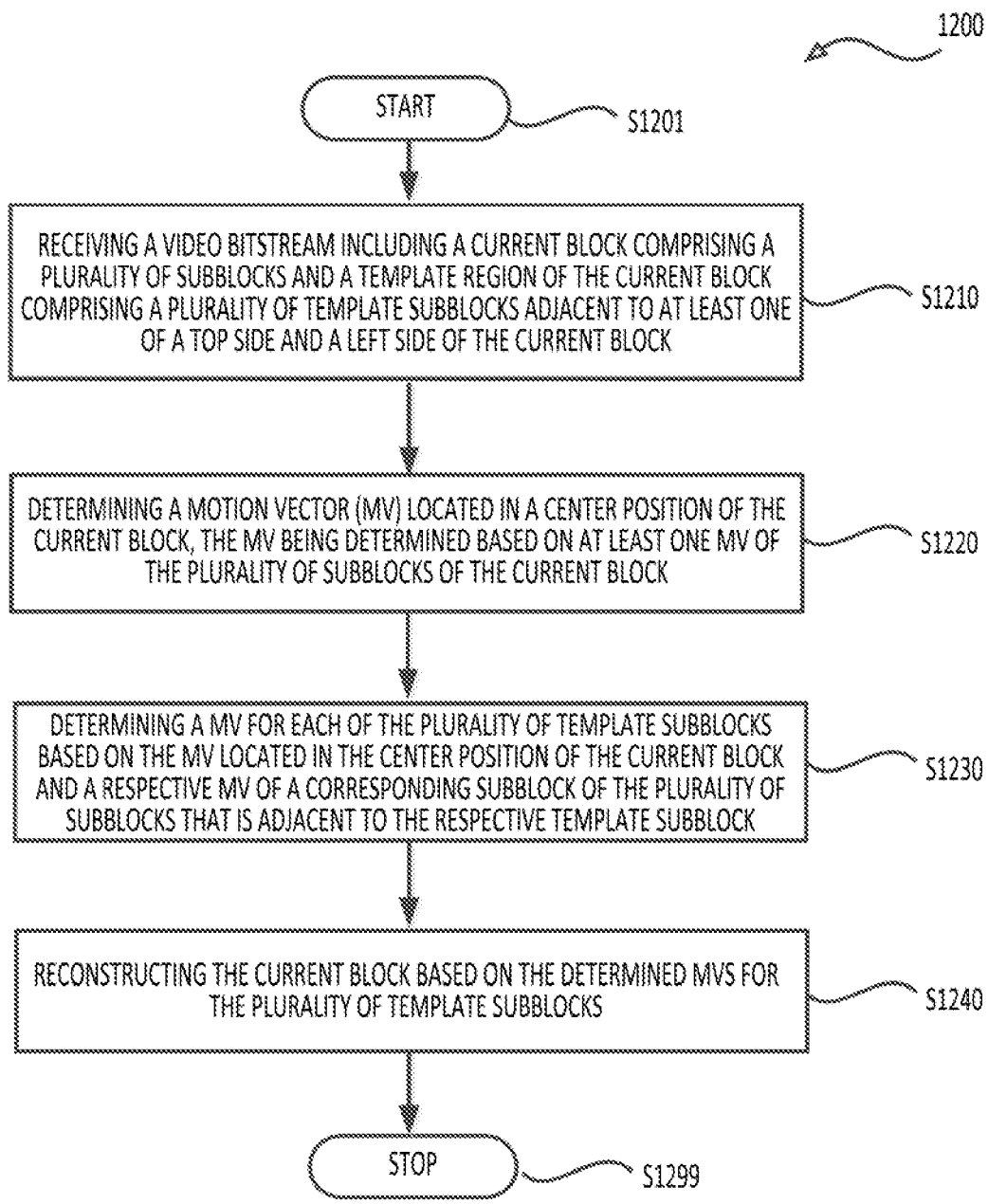
FIG. 12 shows a flow chart outlining a decoding process according to some embodiments of the disclosure.

FIG. 12 shows a flow chart outlining a process (1200) according to an embodiment of the disclosure. The process (1200) can be used in a video decoder. In various embodiments, the process (1200) is executed by processing circuitry, such as the processing circuitry that performs functions of the video decoder (110), the processing circuitry that performs functions of the video decoder (210), and the like. In some embodiments, the process (1200) is implemented in software instructions, thus when the processing circuitry executes the software instructions, the processing circuitry performs the process (1200). The process starts at (S1201) and proceeds to (S1210).

At (S1210), a video bitstream is received. The video bitstream includes a current block comprising a plurality of subblocks and a template region of the current block comprising a plurality of template subblocks adjacent to at least one of a top side and a left side of the current block. For example, the current block includes a plurality of subblocks and the template region includes a plurality of template subblocks as illustrated in any of FIGS. 7-11.

At (S1220), a motion vector (MV) located in a center position of the current block is determined. The MV is determined based on at least one MV of the plurality of subblocks of the current block. In an example, the MV data at the position (2, 2) within the MV field in FIG. 6 could be utilized as the center MV.

At (S1230), a MV for each of the plurality of template subblocks is determined based on the MV located in the center position of the current block and a respective MV of a corresponding subblock of the plurality of subblocks that is adjacent to the respective template subblock. In an example, as shown in FIGS. 7-8, when the reference index of reference list x of an adjacent subblock MV of SbTMVP is not valid and the reference index of reference list x of the center MV of SbTMVP is valid, the center MV and reference index of the reference list x of the center MV could be used as the MV of the reference list x for the subblock template at reference list x.

At (S1240), the current block is reconstructed based on the determined MVs for the plurality of template subblocks.

In an example, the MV located in the center position of the current block is determined as a MV from one of a top-left subblock, a bottom-left subblock, a top-right subblock, and a bottom-right subblock of the current block.

In an example, the MV located in the center position of the current block is determined as a MV from one of the plurality of subblocks, where the one of the plurality of subblocks is selected based on one of a median sample value and a prediction mode of the one of the plurality of subblocks.

In an example, the MV located in the center position of the current block is determined as an average of a subset of the MVs of the plurality of subblocks.

In an aspect, the MV for each of the plurality of template subblocks is determined as a uni-prediction MV based on the MV located in the center position of the current block being a uni-prediction MV. In an aspect, the MV for each of the plurality of template subblocks is determined as a bi-prediction MV based on the MV located in the center position of the current block being a bi-prediction MV.

In an example, based on (i) a MV of a first subblock of the plurality of subblocks being a uni-prediction MV in a first reference list, (ii) a MV for a first template subblock of the plurality of template subblocks adjacent to the first subblock being a uni-prediction MV in a second reference list, and (iii) the MV located in the center position of the current block being a uni-prediction MV in the second reference list, the MV for the first template subblock is determined as the MV located in the center position of the current block.

In an example, based on (i) a MV of a first subblock of the plurality of subblocks being a uni-prediction MV in a first reference list, (ii) a MV for a first template subblock of the plurality of template subblocks adjacent to the first subblock being a bi-prediction MV, and (iii) the MV located in the center position of the current block being a bi-prediction MV that include a first component in the first reference list and a second component in a second reference list, the MV for the first template subblock is determined to include the MV of the first subblock in the first reference list and the second component of the MV located in the center position of the current block in the second reference list.

In an example, based on the MV located in the center position of the current block being a uni-prediction MV, the MV for each of the plurality of template subblocks is determined as the MV of the subblock of the plurality of subblocks adjacent to the respective template subblock.

In an example, based on the MV located in the center position of the current block being a bi-prediction MV, the MV for each of the plurality of template subblocks is determined as the MV of the subblock of the plurality of subblocks adjacent to the respective template subblock.

In an example, based on (i) the MV located in the center position of the current block being a uni-prediction MV in a first reference list (ii) a MV for a first subblock of the plurality of subblocks adjacent to a first template subblock of the plurality of template subblocks being a uni-prediction in a second reference list, the MV for the first template subblock is determine as a bi-prediction MV that includes the MV located in the center position of the current block in the first reference list and the MV for the first subblock in the second reference list.

In an example, to reconstruct the current block, a reference block of the current block is determined based on a difference value between a template region of the reference block and the template region of the current block, where the template region of the reference block is indicated by the MVs of the plurality of template subblocks. Each of the plurality of subblocks is further reconstructed based on a respective subblock of the reference block.

Then, the process proceeds to (S1299) and terminates.

The process (1200) can be suitably adapted. Step(s) in the process (1200) can be modified and/or omitted. Additional step(s) can be added. Any suitable order of implementation can be used.

Figure 13:
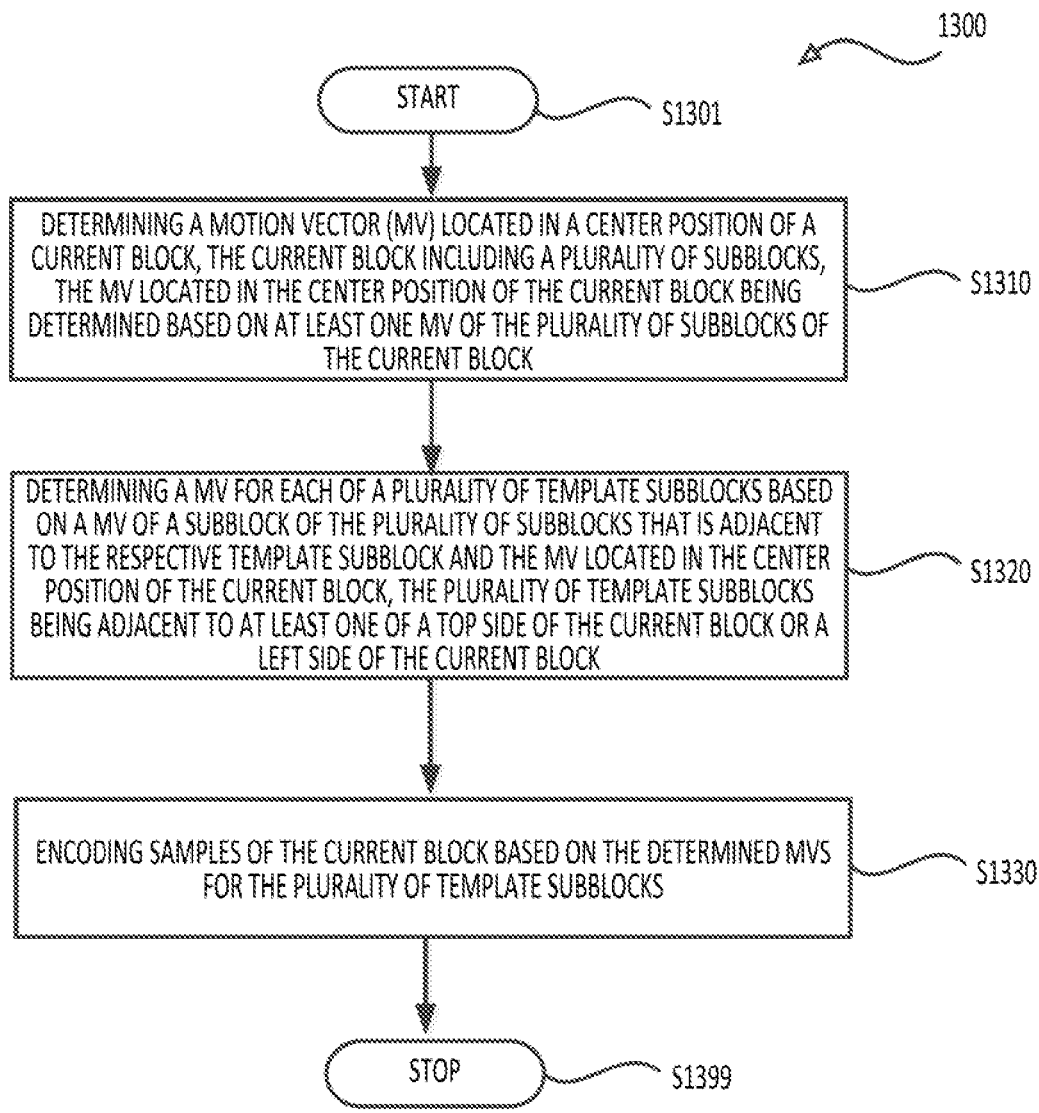
FIG. 13 shows a flow chart outlining an encoding process according to some embodiments of the disclosure.

FIG. 13 shows a flow chart outlining a process (1300) according to an embodiment of the disclosure. The process (1300) can be used in a video encoder. In various embodiments, the process (1300) is executed by processing circuitry, such as the processing circuitry that performs functions of the video encoder (103), the processing circuitry that performs functions of the video encoder (303), and the like. In some embodiments, the process (1300) is implemented in software instructions, thus when the processing circuitry executes the software instructions, the processing circuitry performs the process (1300). The process starts at (S1301) and proceeds to (S1310).

At (S1310), a MV located in a center position of a current block is determined. The current block includes a plurality of subblocks, and the MV located in the center position of the current block is determined based on at least one MV of the plurality of subblocks of the current block. In an example, the MV data at the position (2, 2) within the MV field in FIG. 6 could be utilized as a center MV of a current block (or a MV located in a center position of a current block).

At (S1320), a MV for each of a plurality of template subblocks is determined based on a MV of a subblock of the plurality of subblocks that is adjacent to the respective template subblock and the MV located in the center position of the current block. The plurality of template subblocks is adjacent to at least one of a top side of the current block or a left side of the current block. In an example, as shown in FIGS. 7-8, when the reference index of reference list x of an adjacent subblock MV of SbTMVP is not valid and the reference index of reference list x of the center MV of SbTMVP is valid, the center MV and reference index of the reference list x of the center MV could be used as the MV of the reference list x for the subblock template at reference list x.

At (S1340), samples of the current block are encoded based on the determined MVs for the plurality of template subblocks.

Then, the process proceeds to (S1399) and terminates.

The process (1300) can be suitably adapted. Step(s) in the process (1300) can be modified and/or omitted. Additional step(s) can be added. Any suitable order of implementation can be used.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
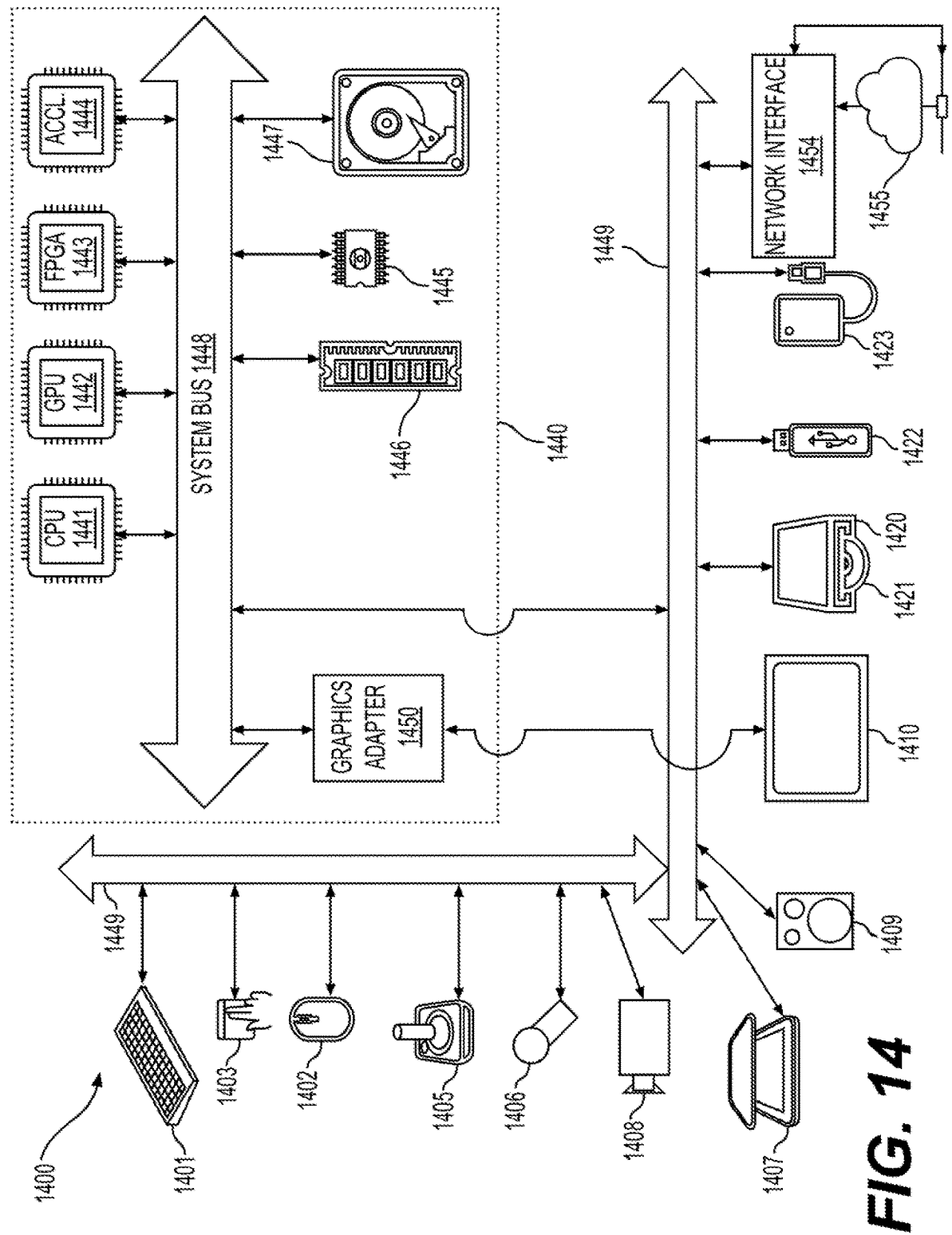
FIG. 14 is a schematic illustration of an exemplary computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, the method comprising:
    receiving a video bitstream including a current block comprising a plurality of subblocks and a template region of the current block comprising a plurality of template subblocks adjacent to at least one of a top side and a left side of the current block;
    determining a motion vector (MV) located in a center position of the current block, the MV being determined based on at least one MV of the plurality of subblocks of the current block;
    determining a MV for each of the plurality of template subblocks based on (i) whether the MV located in the center position of the current block is a uni-prediction MV and (ii) a respective MV of a corresponding subblock of the plurality of subblocks that is adjacent to the respective template subblock and positioned in a same picture as the respective template subblock; and
    reconstructing the current block based on the determined MVs for the plurality of template subblocks.

2. The method of claim 1, wherein the determining the MV located in the center position of the current block further comprises:
    determining the MV located in the center position of the current block as a MV from one of a top-left subblock, a bottom-left subblock, a top-right subblock, and a bottom-right subblock of the current block.

3. The method of claim 1, wherein the determining the MV located in the center position of the current block further comprises:
    determining the MV located in the center position of the current block as a MV from one of the plurality of subblocks, the one of the plurality of subblocks being selected based on one of a median sample value and a prediction mode of the one of the plurality of subblocks.

4. The method of claim 1, wherein the determining the MV located in the center position of the current block further comprises:
    determining the MV located in the center position of the current block as an average of a subset of the MVs of the plurality of subblocks.

5. The method of claim 1, wherein the determining the MV for each of the plurality of template subblocks further comprises:
    determining that the MV for each of the plurality of template subblocks is the uni-prediction MV when the MV located in the center position of the current block is the uni-prediction MV; and
    determining that the MV for each of the plurality of template subblocks is a bi-prediction MV when the MV located in the center position of the current block is the bi-prediction MV.

6. The method of claim 1, wherein the determining the MV for each of the plurality of template subblocks further comprises:
    when (i) a MV of a first subblock of the plurality of subblocks is the uni-prediction MV in a first reference list, (ii) a MV for a first template subblock of the plurality of template subblocks adjacent to the first subblock is the uni-prediction MV in a second reference list, and (iii) the MV located in the center position of the current block is the uni-prediction MV in the second reference list,
    determining the MV for the first template subblock as the MV located in the center position of the current block.

7. The method of claim 1, wherein the determining the MV for each of the plurality of template subblocks further comprises:
    when (i) a MV of a first subblock of the plurality of subblocks is the uni-prediction MV in a first reference list, (ii) a MV for a first template subblock of the plurality of template subblocks adjacent to the first subblock is a bi-prediction MV, and (iii) the MV located in the center position of the current block is the bi-prediction MV that include a first component in the first reference list and a second component in a second reference list,
    determining that the MV for the first template subblock includes the MV of the first subblock in the first reference list and the second component of the MV located in the center position of the current block in the second reference list.

8. The method of claim 1, wherein the determining the MV for each of the plurality of template subblocks further comprises:
    when the MV located in the center position of the current block is the uni-prediction MV, determining the MV for each of the plurality of template subblocks as the MV of the subblock of the plurality of subblocks adjacent to the respective template subblock.

9. The method of claim 1, wherein the determining the MV for each of the plurality of template subblocks further comprises:

when the MV located in the center position of the current block is a bi-prediction MV, determining the MV for each of the plurality of template subblocks as the MV of the subblock of the plurality of subblocks adjacent to the respective template subblock.

10. The method of claim 1, wherein the determining the MV for each of the plurality of template subblocks further comprises:
when (i) the MV located in the center position of the current block is the uni-prediction MV in a first reference list and (ii) a MV for a first subblock of the plurality of subblocks adjacent to a first template subblock of the plurality of template subblocks is the uni-prediction in a second reference list,
determining the MV for the first template subblock being a bi-prediction MV that includes the MV located in the center position of the current block in the first reference list and the MV for the first subblock in the second reference list.

11. The method of claim 1, wherein the reconstructing the current block further comprises:
determining a reference block of the current block based on a difference value between a template region of the reference block and the template region of the current block, the template region of the reference block being indicated by the MVs of the plurality of template subblocks; and
reconstructing each of the plurality of subblocks based on a respective subblock of the reference block.

12. A method of video encoding, the method comprising:
determining a motion vector (MV) located in a center position of a current block, the current block including a plurality of subblocks and being adjacent to a template region, the template region including a plurality of template subblocks adjacent to at least one of a top side and a left side of the current block, the MV being determined based on at least one MV of the plurality of subblocks of the current block;
determining a MV for each of the plurality of template subblocks based on (i) whether the MV located in the center position of the current block is a uni-prediction MV and (ii) a respective MV of a corresponding subblock of the plurality of subblocks that is adjacent to the respective template subblock and positioned in a same picture as the respective template subblock; and
encoding the current block based on the determined MVs for the plurality of template subblocks.

13. The method of claim 12, wherein the determining the MV located in the center position of the current block further comprises:
determining the MV located in the center position of the current block as a MV from one of a top-left subblock, a bottom-left subblock, a top-right subblock, and a bottom-right subblock of the current block.

14. The method of claim 12, wherein the determining the MV located in the center position of the current block further comprises:
determining the MV located in the center position of the current block as a MV from one of the plurality of subblocks, the one of the plurality of subblocks being selected based on one of a median sample value and a prediction mode of the one of the plurality of subblocks.

15. The method of claim 12, wherein the determining the MV located in the center position of the current block further comprises:
determining the MV located in the center position of the current block as an average of a subset of the MVs of the plurality of subblocks.

16. The method of claim 12, wherein the determining the MV for each of the plurality of template subblocks further comprises:
determining that the MV for each of the plurality of template subblocks is the uni-prediction MV when the MV located in the center position of the current block is the uni-prediction MV; and
determining that the MV for each of the plurality of template subblocks is a bi-prediction MV when the MV located in the center position of the current block is the bi-prediction MV.

17. The method of claim 12, wherein the determining the MV for each of the plurality of template subblocks further comprises:
when (i) a MV of a first subblock of the plurality of subblocks is the uni-prediction MV in a first reference list, (ii) a MV for a first template subblock of the plurality of template subblocks adjacent to the first subblock is the uni-prediction MV in a second reference list, and (iii) the MV located in the center position of the current block is the uni-prediction MV in the second reference list,
determining the MV for the first template subblock as the MV located in the center position of the current block.

18. The method of claim 1, wherein the determining the MV for each of the plurality of template subblocks further comprises:
when (i) a MV of a first subblock of the plurality of subblocks is the uni-prediction MV in a first reference list, (ii) a MV for a first template subblock of the plurality of template subblocks adjacent to the first subblock is a bi-prediction MV, and (iii) the MV located in the center position of the current block is the bi-prediction MV that include a first component in the first reference list and a second component in a second reference list,
determining that the MV for the first template subblock includes the MV of the first subblock in the first reference list and the second component of the MV located in the center position of the current block in the second reference list.

19. The method of claim 1, wherein the determining the MV for each of the plurality of template subblocks further comprises:
when the MV located in the center position of the current block is the uni-prediction MV, determining the MV for each of the plurality of template subblocks as the MV of the subblock of the plurality of subblocks adjacent to the respective template subblock.

20. A method of processing visual media data, the method comprising:
processing a bitstream of the visual media data according to a format rule, wherein:
the bitstream includes coded information of a current block comprising a plurality of subblocks and a template region of the current block comprising a plurality of template subblocks adjacent to at least one of a top side and a left side of the current block;
the format rule specifies that:
a motion vector (MV) located in a center position of the current block is determined based on at least one MV of the plurality of subblocks of the current block;
a MV for each of the plurality of template subblocks is determined based on (i) whether the MV located in the center position of the current block is a uni-prediction MV and (ii) a respective MV of a corresponding subblock of the plurality of subblocks that is adjacent to the respective template subblock and positioned in a same picture as the respective template subblock; and the current block is processed based on the determined MVs for the plurality of template subblocks.

\* \* \* \* \*